Aug. 11, 1942.  F. E. TERRILL  2,292,908
TIME AND SPEED MEASURING APPARATUS
Filed Nov. 8, 1940  2 Sheets-Sheet 1

INVENTOR
Forrest E. Terrill
BY
ATTORNEY

Aug. 11, 1942.　　　　　F. E. TERRILL　　　　　2,292,908

TIME AND SPEED MEASURING APPARATUS

Filed Nov. 8, 1940　　　　　2 Sheets-Sheet 2

INVENTOR
Forrest E. Terrill
BY
ATTORNEY

Patented Aug. 11, 1942

2,292,908

UNITED STATES PATENT OFFICE 2,292,908

TIME AND SPEED MEASURING APPARATUS

Forrest E. Terrill, Arkansas City, Kans., assignor to Western Railroad Supply Company, Chicago, Ill., a corporation of Delaware Application November 8, 1940, Serial No. 364,891

3 Claims. (Cl. 161—18)

My invention relates to apparatus for measuring and determining the speed of travel of vehicles on a roadway, and it has particular reference to the provision and organization of apparatus particularly well adapted to measure and determine the speeds at which railway trains operate over a stretch of railway track.

In general, it is proposed in accordance with my invention to locate spaced apart in the path of travel of a vehicle, contactor devices operable by the vehicle and arranged to control electroresponsive means which causes operation of a timing device during the interval between successive actuations by the vehicle of the contactor devices. More particularly, my invention provides means for controlling a clockwork timing mechanism such as a stop watch by actuating the plunger or stem of the watch to start and stop operation thereof respectively in response to successive actuations by a vehicle of at least two contactor devices located in the path of travel of the vehicle.

My invention has for an object the provision of novel and improved means for effecting the control by a vehicle of timing means arranged in the above described manner.

Another object of my invention is the provision of relatively inexpensive, readily portable and accurate means for measuring the time between successive actuations of contactor devices by a vehicle.

Other important objects and characteristic features of my invention will become readily apparent from the following description of a preferred form of apparatus embodying my invention, applied to the measurement of speed of railway vehicles. It is to be understood, of course, that the represented use of such apparatus is merely illustrative and is but an example of many uses where my invention will be useful.

In the accompanying drawings, where similar reference characters have been employed to designate corresponding parts, Fig. 1 is a diagrammatic view representing a circuit arrangement and wiring diagram of apparatus embodying my invention as applied to measuring the speed of railway vehicles.

Figure 1:
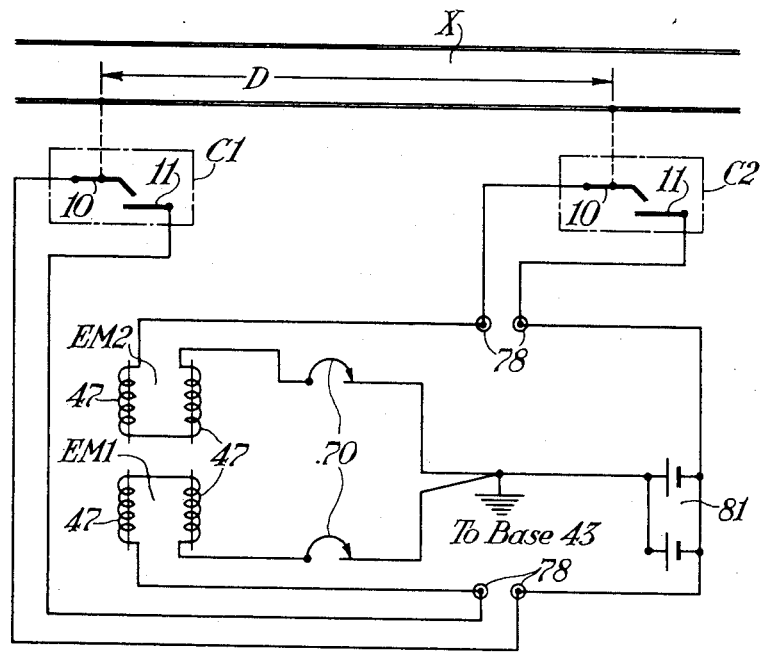
Figure 4:
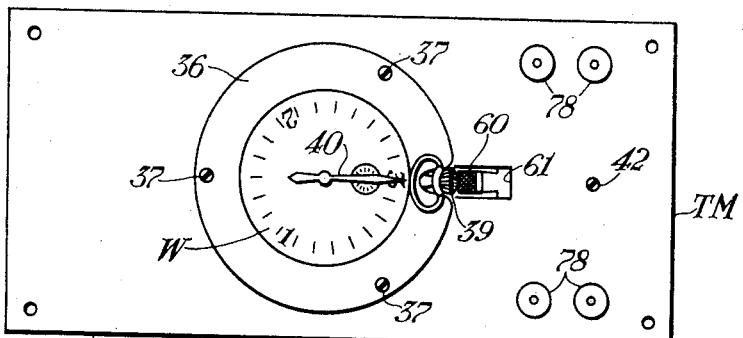
Fig. 4 is a top plan view of a timing mechanism TM embodying my invention and incorporating the electromagnets EM represented in Fig. 1.

Referring to Fig. 1, the reference characters C with distinguishing suffixes designate contactor devices located spaced apart in a stretch of railway trackway X so as to be successively actuated by a vehicle or train as it operates on the track. The two contactors C1 and C2, as shown, are preferably disposed adjacent the same track rail of the stretch, and preferably are of the type comprising a movable member which is operated from a normal to an operated position in response to actuation by the leading wheel of a vehicle on the track. A preferred form of construction of contactor devices of this type is shown in Figs. 2 and 3.

Figures 2, 3:
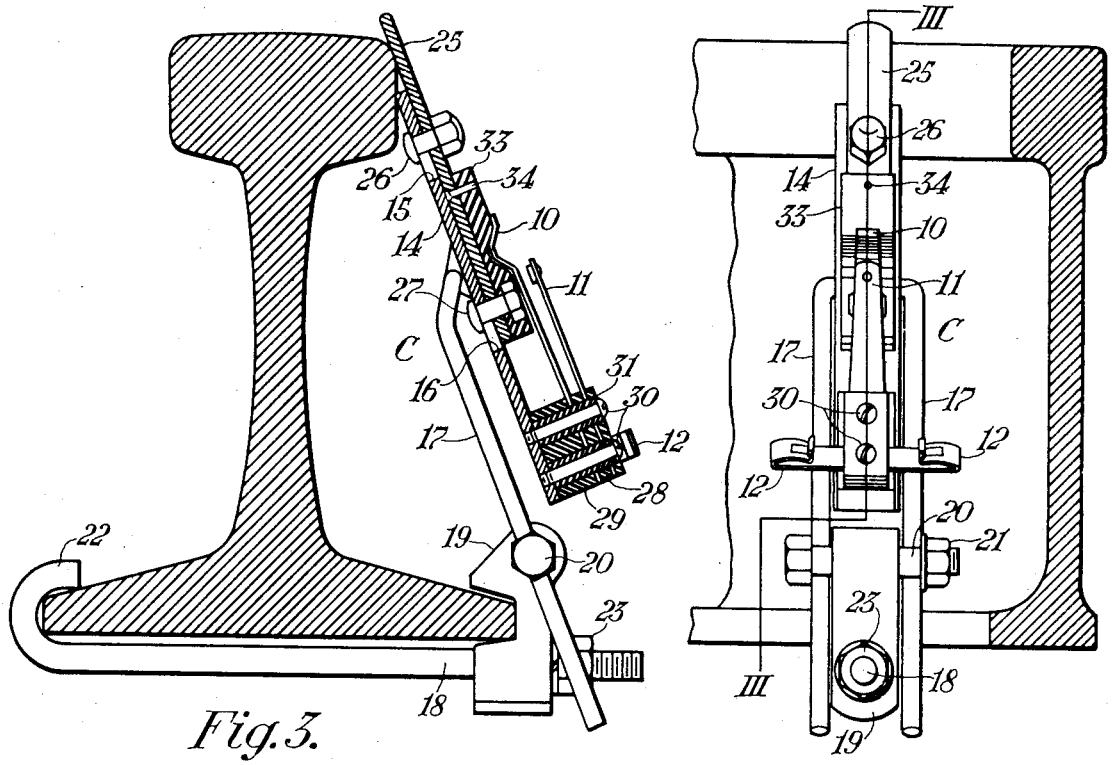
Fig. 2 is a front elevational view illustrating a preferred form of construction of a contactor device C represented in Fig. 1.
Fig. 3 is a side elevational view, partially sectioned on the line III—III of Fig. 2, of the contactor device C shown in Fig. 2.

Referring now to Figs. 2 and 3, contactor device C as shown comprises a supporting member 14 provided with longitudinal slots 15 and 16 and secured, as by welding, to a U-shaped clip member 17 which in turn is fastened to a bracket 19 by means of a drilled or slotted bolt 20 and a nut 21. The bracket 19 is secured to a rail by a clamp 18 which extends under the rail and is provided on one end with an upturned lug 22 which engages the flange on the inner or gauge side of the rail, and the other threaded end of clamp 18 is inserted through a hole in bracket 19 which is shaped to engage the outer flange of the rail so as to secure the bracket to the rail when nut 23 threaded on the clamp is drawn up against the bracket. The clip 17 when inserted in the slots of bolt 20 may be adjusted so that when nut 21 is drawn up, a movable contact member 25 slidably mounted as by bolts 26 and 27 in the slots of supporting member 14, is disposed just touching the outer side of the rail ball and projects a short distance, say ¼ or ⅜ of an inch, above the top of the rail ball. A pair of contact members 10 and 11, spaced apart by insulating spacer 28 and spaced from supporting member 14 by another insulating spacer member 29, are secured to supporting member 14 as by screws 30 provided with insulating bushings 31. Each contact member 10 and 11 is provided with a spring contact clip 12 to facilitate making electrical contact with such members. Contact member 10 is provided at its outer end with a V-shaped bend adapted to fit in a correspondingly shaped depression formed in a contact operating member or cam 33 formed of insulating material and secured, as by rivets 34, to slidable member 25. The parts are so proportioned that when member 25 is in its normal position wherein it extends a short distance above the top of the rail ball, the member 25 is at the top of the slots 15 and 16 in supporting member 14, as viewed in Fig. 3, and the V-shaped bend of contact member 10 rides in the depression of cam 33 so that contacts 10 and 11 are out of engagement.

When a train operates along the track, the tread of the leading wheel of the train strikes contact member 25 to force it down in the slots of supporting member 14, and the V-shaped bend of contact member 10 is forced out of the depression of cam 33 and is actuated into engagement with contact member 11 to close contact 10—11. It is, of course, apparent that movable contact member 25 remains in its operated position wherein contact 10—11 is closed until such time as the member is manually restored to its normal or projecting position, and that succeeding wheels of the train will have substantially no effect upon either contact member 25 or contact 10—11. It follows, therefore, that contact 10—11 is closed by the leading wheel of the train and is retained closed until contact operating member 25 is restored to its normal position.

The two contactor devices C are arranged (see Fig. 1) to control respectively two electromagnets, designated by the reference characters EM with suitably distinguishing suffixes, which in turn control a timing device, such as a stop watch W hereinafter referred to, to measure or determine the time interval elapsing between successive actuations of the two contactor devices. The specific manner in which the contactor devices C establish control of the timing device will be explained in detail presently, but at this time it should be noted that such control is established by causing each electromagnet to operate from a normal to an operated position when its associated contactor device C is actuated, and each magnet when caused to operate actuates means for depressing or actuating a plunger or stem of a clockwork timing device of the class caused to operate when the plunger is actuated and caused to cease operation when the plunger is again actuated.

The electromagnets EM are incorporated into a timing mechanism TM for controlling the operation of a timing device to cause such device to operate during the interval elapsing between successive actuations of the contactor devices C. The timing mechanism TM is shown in Figs. 4, 5, 6 and 7, and it includes a timing device comprising a stop watch W enclosed in a casing 36 fastened by screws 37 to a panel 38, with the stem or plunger 39 of the watch projecting from an opening in the casing. The watch W preferably is of the type having three-second and three-minute hands, that is, one hand 40 of the watch makes a complete revolution of the large dial shown in Fig. 4 in three seconds while the other hand (not visible in Fig. 4) makes a complete revolution of the small dial shown in Fig. 4 in three minutes; but it is to be understood, of course, that my invention contemplates and embraces the use of other types of stop watches, the essential feature being that operation of the watch or clockwork timing mechanism is effected by actuating a plunger and such operation is terminated by again actuating the plunger. Such watches are well known in the art, and ordinarily include a spring biased plunger or stem 39 effective to start, stop, and reset the hands, in response to successive depressions of the stem.

Figure 5:
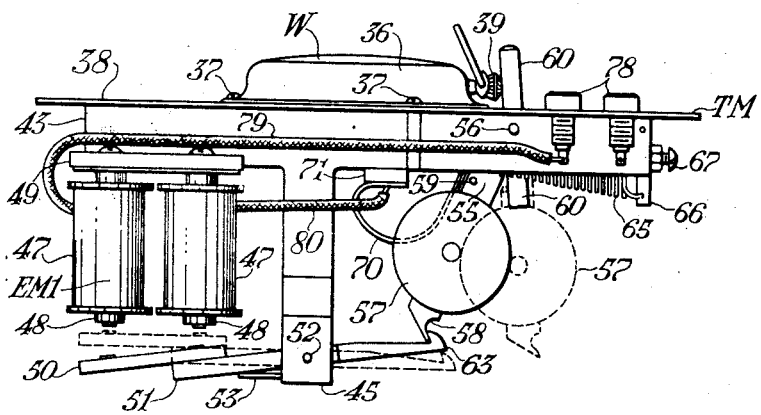
Fig. 5 is a side elevational view of the timing mechanism TM illustrated in Fig. 4.
Figure 6:
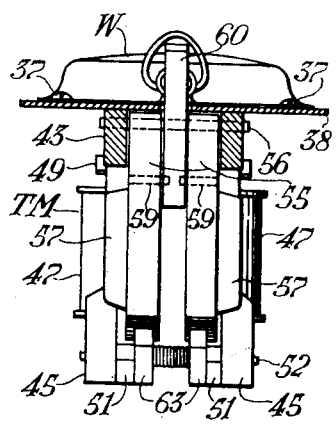
Fig. 6 is a front elevational view of the timing mechanism TM, with a portion of the panel 38 and base member 43 broken away to show more clearly the arrangement of the parts.
Figure 7:
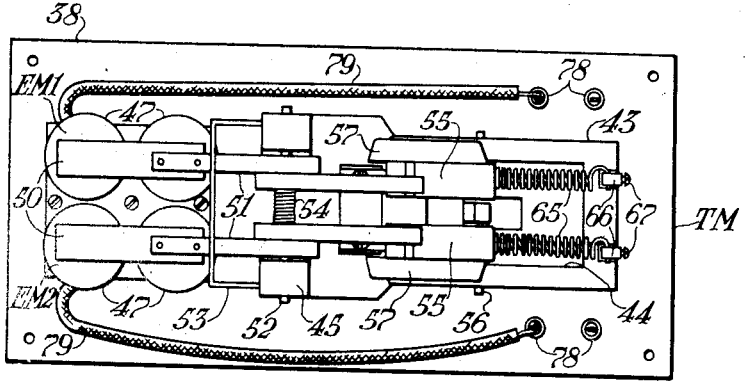
Fig. 7 is an inverted plan view of the timing mechanism TM.

Secured to panel 38 as by screws 37 and 42 is a base member 43 preferably constructed of electrical conducting material and provided with an opening 44 (see Fig. 7) and also with a bifurcated depending portion 45 (see Figs. 5 and 6). Supported from the base member 43 are two electromagnets EM1 and EM2 each comprising two coils 47 surrounding two cores 48 connected together at their upper ends by backstraps 49. Each magnet is provided with an armature 50 of magnetizable material, and the two armatures are fastened respectively to two levers 51 pivoted by a pin 52 to the bifurcated dependent portion 45 of base 43. Preferably, the levers 51 are held spaced apart by a spring 54 surrounding pin 52 and interposed between the levers 51; and a stop 53 is fastened to dependent portion 45 of base 43 to limit the travel of the armatures 50 when released.

Two operating levers or pendulums 55 pivoted on a pin 56 journaled in the sidewalls of opening 44 of base member 43, are provided at their respective lower ends (as viewed in Fig. 5) with weights 57 and hooks 58. Each operating lever 55 is operatively connected through the medium of a common linkage member 60 to the stem or plunger 39 of watch W, the linkage member 60 being pivoted on pin 56 extending through an opening 61 in the panel to an extended position to engage the stem 39 of the watch. Each operating lever 55 as shown is provided with a lug or pin 59 adapted to engage linkage member 60 so as to cause member 60 to be actuated by either or both of the operating levers 55, as will be made clear presently.

The pivoted levers 51 which are controlled by electromagnets EM are disposed one in the path of travel of each operating lever 55, and each pivoted lever 51 is provided at its extreme right-hand end (as viewed in Fig. 5) with a hook or latch 63 adapted to engage hook 58 carried by its associated operating lever 55. When electromagnets EM are deenergized so that armatures 50 are in their respective released positions, levers 51 are positioned as indicated in full lines in Fig. 5 so that when operating levers 55 are swung, either by actuating linkage member 60 or by manually actuating the levers themselves, to the position in which operating lever 55 is illustrated in full lines in Fig. 5, the hooks 58 of operating levers 55 are engaged by the corresponding hooks 63 of pivoted levers 51. In this position of operating levers 55, the levers are latched against the bias of gravity and of auxiliary or restraining biasing means. The auxiliary biasing means comprises, as shown, springs 65 which are connected at one end to each operating lever 55 and at the other end to depending members 66 secured by screws 67 to base member 43. The springs 65 are selected and proportioned so as to aid the action of gravity on levers 55 when levers 51 are unlatched, and such springs further function to restrict the oscillations of the operating levers 55, as will be made clear presently.

Each of the electromagnets EM is provided with one or more contacts operated from a normal to an operated position upon operation of the associated magnet. While the contacts may be controlled directly by the associated armatures of the electromagnets to closed or opened positions in accordance with the position of such armatures, I prefer to control the contacts through the medium of operating levers 55. As shown, such contacts comprise a flexible contact arm 70 preferably of spring material secured at one end, but insulated therefrom by insulating spacer 71, to base 43 and having its other end positioned to lie in the path of movement of the associated operating lever 55. When an operating lever 55 is latched up against its bias, the associated contact finger 70 is engaged and forced into contact with another contact element, which may, for example, be the base member 43.

Panel 38, as shown, is provided with terminals 78 in order to facilitate making electrical contact with coils 47 of the electromagnets EM. These terminals are suitably insulated from the panel and base member 43, and as shown are preferably arranged in groups of two terminals for each electromagnet, with one terminal of each group permanently connected as by a wire 79 to one terminal of the coils of the associated electromagnet EM. The other terminal of each electromagnet is connected as by a wire 80 to the associated flexible contact finger 70 and hence is connected to base member 43 at such times as the associated operating lever 55 is in its latched up position. As can be seen from an inspection of Fig. 1, one terminal of a suitable source of current, such as a battery 81, is connected to base member 43 and the other terminal of the source is connected to the remaining terminal of each group of terminals 78.

Measurement of the speed of a train on the track is effected by the apparatus just described by locating the contactor devices C along the track a known distance D apart, and by interposing the contacts of devices C, as represented in Fig. 1, each in the circuit of a magnet of timing mechanism TM, that is, by connecting the two contact members 10 and 11 of contactor C1 respectively to the two terminals 78 associated with electromagnet EM1 and by connecting the two contact members 10 and 11 of contactor C2 respectively to the two terminals 78 associated with the other electromagnet EM2. The distance along the track between the two contactors C may be of any convenient value, such as, for example, 264 feet (1/20 of a mile), and it is obvious that when the distance between contactors is known, the rate of speed in feet per second is readily obtained by dividing the distance D by the time in seconds required for the front end of the train to pass from one contactor device C to the other.

With the contactors C spaced apart along the stretch and connected to timing mechanism TM as described hereinbefore; the movable members 25 of devices C operated to their normal positions so that contacts 10—11 are opened and the members extend a short distance above the top of the rail ball; watch W at its normal condition wherein both hands register zero; and operating levers 55 of mechanism TM both latched up in their normal positions represented in full lines in Fig. 5, wherein flexible contact fingers 70 are operated into engagement with base member 43, the apparatus is conditioned to measure the speed of a train or vehicle on the track. When the leading wheel of the train or vehicle strikes movable member 25 of either contactor C1 or C2, the associated contact 10—11 is closed and the associated electromagnet EM becomes energized to actuate its pivoted member 51 and unlatch one of the operating levers 55. For example, if contactor C1 is first encountered by the vehicle, contact 10—11 of that contactor becomes closed and electromagnet EM1 is energized over an obvious circuit easily traced in Fig. 1. The energization of magnet EM1 attracts its armature 50 to a position represented in dash lines in Fig. 5, and the associated pivoted lever 51 accordingly is swung to the position indicated by dash lines in Fig. 5 and thus unlatches the one operating lever 55 controlled thereby. Such unlatched operating lever 55 thereupon swings to the right (as viewed in Fig. 5) in response to its gravity and spring bias, and due to its inertia swings to a position wherein pin or lug 59 carried by the operating lever engages linkage member 60 to actuate such member and cause it to depress the stem 39 of watch W and thus set into operation the clockwork timing of the watch. The unlatched operating lever 55 of course then swings to its left, but the oscillations of the lever are dampened by its respective spring 65 and the lever quickly comes to rest substantially in the position represented by dash lines in Fig. 5, without obtaining sufficient inertia again to cause linkage member 60 to depress the stem 39 of watch W.

Contact 10—11 of device C1 remains closed, as pointed out heretofore, until such time as member 25 is manually restored to its normal position, but electromagnet EM1 is deenergized since the unlatching of operating lever 55 permits spring contact finger 70 to drop away from base 43 and thus interrupt the circuit of magnet EM1. It follows, therefore, that magnet EM1 is momentarily energized when the contact of its associated contactor device C1 is closed, and that this operation of magnet EM1 causes the stem or plunger 39 to watch W to be actuated. The stem of the watch, of course, is restored to its normal position in response to its customary spring bias after actuation by lever 60.

When the leading wheel of the train encounters the other contactor C2, the associated contact 10—11 is closed and magnet EM2 becomes energized over an obvious circuit shown in Fig. 1, whereupon the other pivoted lever 51 associated with that magnet is actuated to unlatch the other operating lever 55. This latter operating lever of course is caused to swing in response to its gravity and spring bias and due to its inertia occupies a position wherein its pin 59 engages linkage member 60 to actuate that member and cause it again to depress the stem 39 of watch W. This action terminates operation of the clockwork timing mechanism of the watch, and the time interval required for the train to traverse the distance between and successive actuations of contactors C is registered on the dial. Electromagnet EM2 of course is deenergized when its associated operating lever 55 becomes unlatched and permits the flexible contact finger 70 interposed in the circuit of magnet EM2 to drop away from base 43.

From the foregoing it is readily apparent that the means that I have provided for measuring the speed of movement of a vehicle on a road or trackway is caused to operate by successive actuations of contactor devices operated by the vehicle, and that each actuation of a contactor device causes but a momentary energization or operation of an associated electroresponsive device. These momentary operations of the electroresponsive devices are translated by inertia means to cause operation of a control plunger or stem of a timing device to cause in turn the operation of such timing device during the interval between successive actuations of two of the contactor devices.

It is also apparent that the apparatus is arranged in such manner as to cancel out whatever time lag exists in the starting and stopping of the watch, that is, an equivalent time lag is introduced into both the starting and stopping operations and hence there is no necessity for a correction for such time lag.

Although I have herein shown and described only one form of time and speed measuring apparatus embodying my invention, it is understood that various changes and modifications may be made therein within the scope of the appended claims without departing from the spirit and scope of my invention.

Having thus described my invention, what I claim is:

1. The combination with a trackway for vehicles and two contactor devices spaced apart in the trackway for successive actuation by a vehicle operating thereover, said contactor devices each having a normally open contact arranged to become closed and remain closed upon actuation by a vehicle, of two electromagnets one for each of said contactor devices, each of said electromagnets having a normally closed contact which becomes open when the associated magnet is energized, a circuit for energizing each of said electromagnets including a source of current, the contact of the associated contactor device and the contact of the electromagnet, two gravity biased levers one for each electromagnet, a timing device comprising a plunger and a normally inactive clockwork mechanism rendered respectively active and inactive by successive actuations of said plunger, an actuating member for causing actuation of said plunger, and means controlled by said two electromagnets for latching said levers against their bias in positions such that each lever when released engages said actuating member to cause such member to actuate said plunger.

2. In combination with a trackway for vehicles and two contactor devices spaced apart in the trackway for successive actuation by a vehicle operating thereover, said contactor devices each having a normally open contact which becomes closed and remains closed upon actuation by a vehicle, an electromagnetic device, means controlled by said contactor and electromagnetic devices for momentarily supplying an impulse of electrical current to said electromagnetic device in response to an actuation of either of said contactor devices, a stop watch mechanism including a plunger and a normally inactive clockwork mechanism rendered respectively active and inactive in response to successive actuations of said plunger, and means operable by said electromagnetic device in response to an impulse of energy for actuating said plunger.

3. In combination with a stretch of railway track and two contactor devices located spaced apart along said track for successive actuation by a vehicle on said track, each of said contactor devices having a normally open contact which becomes closed and remains closed upon actuation by a vehicle, an electromagnetic device, a circuit for energizing said electromagnetic device controlled by said contactor devices and completed whenever either of said devices becomes closed, means operated by said electromagnetic device and interposed in said circuit for interrupting said circuit whenever said electromagnetic device becomes energized following an actuation of a contactor device, a stop watch mechanism comprising a plunger and a normally inactive clockwork mechanism that becomes respectively active and inactive in response to successive actuations of said plunger, and means operable by said electromagnetic device and rendered effective when such device becomes energized for actuating said plunger.

FORREST E. TERRILL.